April 30, 1968

W. R. HEATHE 3,380,162

AIR TURBINE MOTOR WITH RESILIENTLY BIASED
ADJUSTABLE TAPERED BEARINGS

Filed Oct. 5, 1966

INVENTOR.
WILLIAM R. HEATHE

BY

ATTORNEY

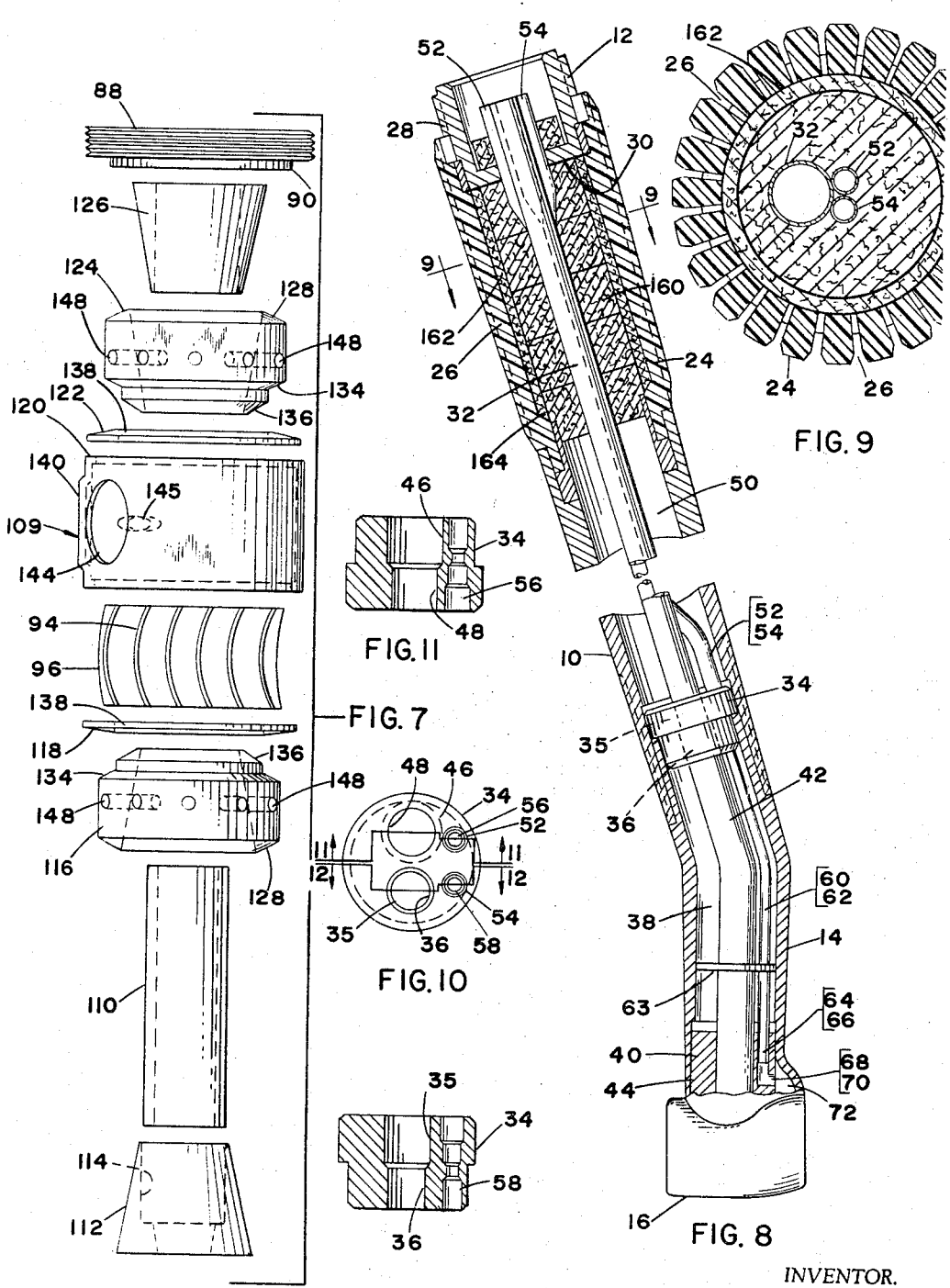

INVENTOR.
WILLIAM R. HEATHE

United States Patent Office 3,380,162
Patented Apr. 30, 1968

3,380,162
AIR TURBINE MOTOR WITH RESILIENTLY BIASED ADJUSTABLE TAPERED BEARINGS
William R. Heathe, York, Pa., assignor to The Dentists' Supply Company of New York, York, Pa., a corporation of New York
Continuation-in-part of application Ser. No. 498,281, Oct. 20, 1965. This application Oct. 5, 1966, Ser. No. 584,596
16 Claims. (Cl. 32—27)

ABSTRACT OF THE DISCLOSURE

An air turbine motor having a rotor on a shaft supported by combination radial and thrust air bearings each comprising cooperating stator and rotor bearings having complementary tapered bearing surfaces, axially variable yieldable means extending between said stator bearings, and positioning means operable in opposition to said variable yieldable means to move said one of said stator bearings axially to establish a desired running clearance between said stator and rotor bearings.

---

This application is a continuation-in-part of application Ser. No. 498,281, filed Oct. 20, 1965, now abandoned.

This invention pertains to a motor comprising an air turbine having a shaft supported by air bearings. Preferably, said motor structure is adapted to be of miniature size, whereby the same is highly suitable for use within a dental handpiece. Specifically, the present invention pertains particularly to air bearings of novel design supporting said rotor and additional features associated therewith, which incidentally involve certain features of the impeller of the turbine as well as other turbine and handpiece elements incident to mounting and operating said air bearings. The motor and air bearings comprising the present invention are not to be restricted to use in dental handpieces since the same are adapted to use in various other items and mechanisms, particularly of small or miniature size and especially where high speeds, substantially in excess of 100,000 r.p.m. are to be developed. For convenience and simplicity of illustration and description of the invention, a dental handpiece has been selected to provide a practical application for the motor and air bearings comprising the invention, but in so doing, it is not intended to restrict the invention to such use.

Various types of air bearing constructions have previously been devised and employed in dental handpieces. For various reasons, however, the handpieces employing these structures have not received wide acceptance, nor has the performance thereof been satisfactory from the standpoint of available torque and other desirable operational characteristics, such as instant starting, especially after the rotor has been stalled, ease of mounting the turbine and bearings within the head of the handpiece, and ease of manufacture, to mention only some of the most salient defects and difficulties found to be present in existing air bearing-type handpieces.

It is the principal object of the present invention to provide a motor having a fluid-operated turbine in the housing thereof, the turbine being supported by air bearings comprising cooperating rotor bearings and stator bearings, and including resilient means engageable with the stator bearings and operable primarily to yield and permit limited movement of said stator bearings toward each other to cause a desired running clearance to be provided between said rotor and stator bearings, cooperating pairs of which are provided adjacent opposite ends of the housing of the motor.

It is a further object of the invention to provide positioning means, preferably in the form of seats, respectively disposed in one end of the housing of the motor and in a threaded cap in the opposite end, said seats respectively engaging the outermost ends of the stator bearings and operable to move the same axially toward each other, against the force of said aforementioned resilient means, to facilitate the establishment of said running clearance between the rotor and stator bearings of the motor as well as operatively clamp the stator bearings in operative position under such circumstances.

It is a further object of the invention to provide complementary segmental spherical surfaces respectively on said seats and upon the surfaces of the stator bearings coengaging said seats in order to provide appropriate limited movement of said stator bearings to permit self-seating of said bearings within said seats in a manner to provide self-aligning of the stator bearings with respect to the rotor bearings and said seats.

Ancillary to the foregoing objects, it is a still further object to provide simultaneous and resilient self-equalizing of the rotor bearings with respect to the stator bearings by the use of resilient means which preferably comprise distortable annular springs or washers, the inner peripheries of which engage portions of the stator bearings in a manner which tends constantly to urge the same axially in opposite directions away from each other and respectively toward the rotor bearings with which they are associated, the outer circumferences of said washers being maintained in constant axially spaced relationship by suitable spacing means which incidentally surround the impeller of the turbine.

It is another important object of the invention to arrange the rotor, the stator and rotor bearings, the aforementioned flexible washers and the spacing means therefor, as a cartridge assembly capable of being precisely assembled at a factory, for example, and readily insertable within one end of the housing of the motor for reception of one end of the lowermost stator bearing upon a seat in the inner end of the housing of the motor, while a seat in the cap correspondingly engages the outer end of the opposite stator bearing, and running clearance between the stator and rotor bearings adjacent opposite ends of the rotor readily is established simply by threading the cap into a desired closing relationship with respect to the opposite end of the housing of the motor from said first-mentioned end, the cartridge otherwise being readily removable from the housing of the motor for replacement, servicing, or the like.

A still further object of the invention is to provide segmental, spherical surfaces upon the stator bearings in the regions thereof which respectively engage the perimeter of the central holes in the flexible annular springs or washers so as to further facilitate self-alignment of said stator bearings with respect to the rotor bearings disposed therein and the engagement of the spherical surfaces of the stator bearings by the perimeters of the central holes in the flexible springs and the seats in the housing and cap being such as to accurately clamp said stator bearings in operative position after the alignment thereof has been achieved.

Still another object of the invention, especially when applied to a dental handpiece is to provide novel means comprising a spray annulus in the end of the head of the handpiece nearest the end of the shaft from which a cutting bur, or the like, extends.

Still other objects of the invention, especially when applied to a dental handpiece are to provide certain novel and useful arrangements for distributing both driving air and bearing air respectively to the impeller and air bearings, connection thereof to the supply conduits within a handle readily being effected in a foolproof manner by appropriate indexing means with respect to the aforementioned cartridge and the interior of the head of the handpiece within which it is received.

Details of the foregoing objects and of the invention, as well as other objects thereof, are set forth in the following specification and illustrated in the accompanying drawings comprising a part thereof.

In the drawings:

FIG. 7 is a longitudinally exploded view of the cartridge structure shown in FIG. 3 to illustrate details of all elements thereof.

FIG. 8 is a longitudinal sectional view of the handle and neck portion of the handpiece to illustrate details especially of the air and water distributing arrangement therein, as well as muffling mechanism.

FIG. 9 is an enlarged transverse sectional view of the muffling means in the handle of the handpiece shown in FIG. 8, as viewed on the line 9—9 of said figure.

FIG. 10 is a plan view of a combination supporting and connecting block mounted within the handle of the handpiece intermediately of the ends thereof.

FIG. 11 is a transverse sectional view of the block shown in FIG. 10 as seen in the direction of the arrows on the vertical section line 11—11 shown in FIG. 10.

FIG. 12 is a view similar to FIG. 11, but showing the opposite side of said block from that illustrated in FIG. 11, as seen on the line 12—12 in FIG. 10.

Figure 1:
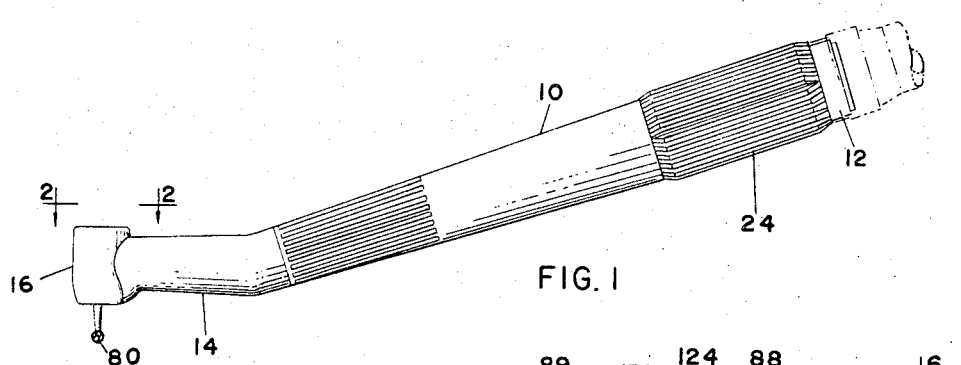
FIG. 1 is a longitudinal elevation of the exterior of a dental handpiece embodying the principles of the present invention.
Figure 2:
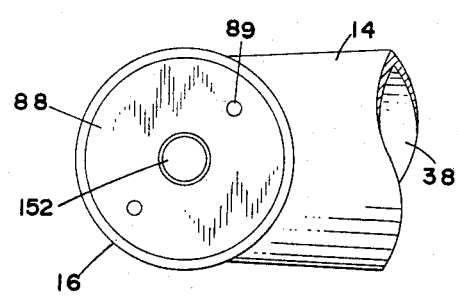
FIG. 2 is a fragmentary, enlarged plan view of the head end of the handpiece illustrated in FIG. 1 as viewed on the line 2—2 of said figure.
Figure 3:
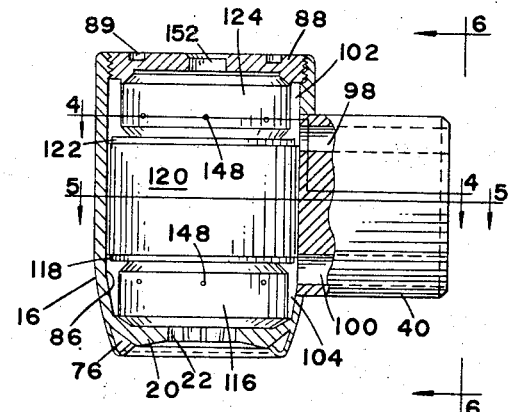
FIG. 3 is a vertical sectional elevation on a scale similar to that of FIG. 2 and illustrating details of the head and the manner in which the cartridge comprising the rotor and air bearings therefor are disposed in operative position within the head, said view also showing a projection by which the head is secured to the neck of the handle of the handpiece.
Figure 13:
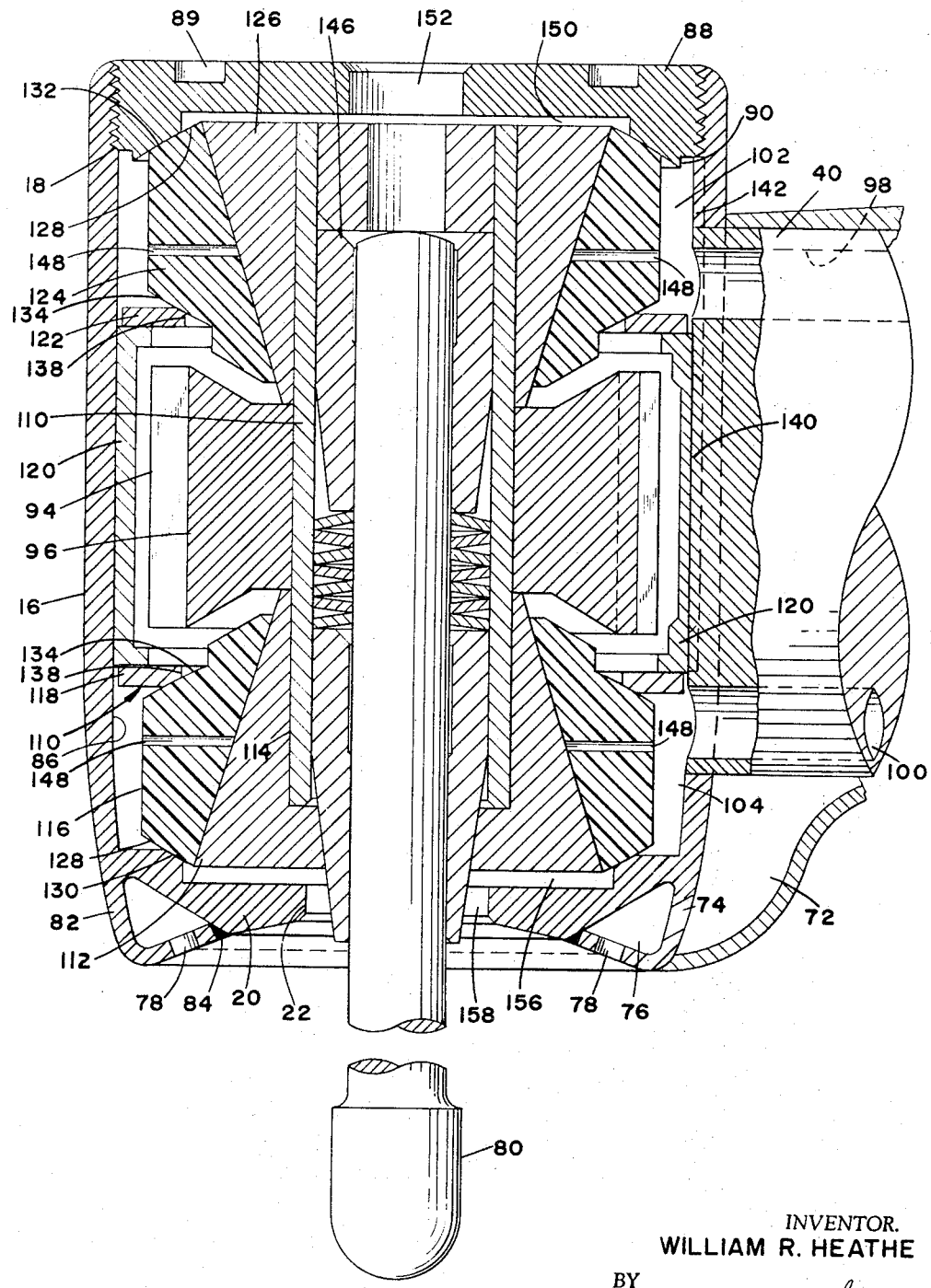
FIG. 13 is a still further enlarged vertical sectional view of the entire head of the handpiece, including the cartridge therein and illustrating details of the same.

Referring particularly to FIGS. 1 and 8, the handpiece selected for purposes of illustrating and describing the present invention comprises a generally tubular handle 10 preferably formed from a plurality of connected sections and provided with coupling means 12 at the rear end and a neck 14 at the forward end extending angularly to the handle and to which a housing or head 16 is connected at the forward end of said neck, preferably in a permanent manner. As best shown in FIGS. 3 and 13, the head 16 is hollow and is provided with an opening 18 at the upper end thereof, the inner walls of which are threaded. The head also has a bottom 20, preferably integral with the side walls of the head, and a shaft opening 22 is formed centrally in said bottom.

The rear end portion of the handle 10 also is formed to include a muffle structure 24, details of which are best shown in FIGS. 8 and 9. It will be seen that the diameter of said structure is slightly greater than the remaining portion of the handle and said portion is provided with a series of longitudinally extending slots 26 which are spaced circumferentially around the outer end portion of the handle. Said outer end portion of the handle also is suitably socketed to receive the inner end of an exteriorly threaded coupling plug 28, which is bored inwardly from the outer end to provide a transverse wall 30 through which a plurality of tubes, to be described in detail hereinafter, extend. The walls of the tubes preferably are sealed with respect to holes therefor provided in the wall 30.

The rearward portion of handle 10 accommodates a longitudinally extending conduit 32, which preferably is a metal tube and may be regarded as the main air delivery tube. The outer end thereof is connected to a suitable source of air under pressure and said air is transmitted by said tube to the block 34, the forward end of conduit 32 being fitted into the counter-bored hole 35, which is clearly shown in FIG. 10. Said hole extends entirely through the block 34 and terminates in a discharge end 36, shown best in FIG. 8, which discharges air under pressure into plenum chamber 38, which comprises the interior of the neck and forward end of the handle. It extends from the block 34 to the inner surface of head plug or block 40, which preferably is integral with the head 16 and is press-fitted or otherwise firmly secured within the forward end of the neck 14, such attachment being rendered air-tight by epoxy resin, solder, or otherwise.

Figure 6:
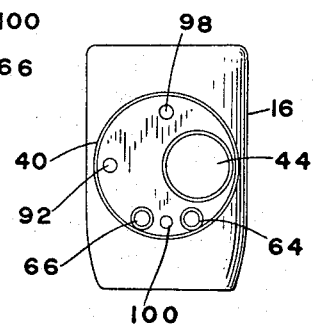
FIG. 6 is an end view of the head unit of the handpiece illustrated in FIG. 3 as seen from the line 6—6 of said figure.

An air-exhaust tube 42 is secured at its inner end within a bore 44, see FIGS. 6 and 8, formed longitudinally within the head plug 40. The opposite end of tube 42 fits into a preferably counter-bored hole 46 formed beside hole 35 in block 34, the larger end thereof extending forwardly to receive said end of exhaust ube 42, preferably with a close, air-tight fit employing solder, epoxy resin, or the like. The hole 46 terminates in a discharge end 48, see FIG. 11, which freely exhausts into the hollow interior 50 of the handle 10 which extends between the block 34 and muffle structure 24. The forward end of exhaust tube 42 communicates with the interior of head 16 in a manner to be described.

Also extending longitudinally through handle 10 is a pair of conduit tubes 52 and 54 which are of smaller capacity than conduit 32, the rear ends of said tubes respectively being connected with sources of air and water under pressure, and the forward ends thereof respectively extend into suitable bores 56 and 58 in block 34. Supplementary tubes 60 and 62, of smaller diameter than tubes 52 and 54, extend forwardly from the bores 56 and 58 and respectively are closely received and secured in air and water-tight relationship respectively with bores 64 and 66 extending partially and longitudinally into the head plug 40 from the terminal end thereof within the neck 14. A skeletonized spacer 63 facilitates the positioning of tubes 42, 60 and 62 in neck 14. As will be best seen from FIGS. 4 and 5, as well as FIG. 8, transversely extending discharge bores 68 and 70 intersect bores 64 and 66 and respectively discharge air and water into a small mixing chamber 72, which is formed in the neck housing adjacent head 16 and directly below the head block 40 adjacent the lower part of head 16, as best seen in FIG. 8.

Referring to FIG. 13, it will be seen that the mixing chamber 72 communicates through an opening 74 with an annular manifold 76 formed around the periphery of the bottom 20 of head 16 and having a plurality of preferably angularly directed, circumferentially spaced discharge ports 78 arranged to discharge a spray mist of mixed water and air, under pressure, toward the operative end of the bur 80, one exemplary illustration of which is shown in FIG. 13 in foreshortened manner.

The manifold 76 may be formed somewhat uniquely by turning or otherwise forming an annular flange 82 integrally with the side walls of the head 16, particularly where the head 16 is turned from solid bar stock upon a lathe, for example, this method also being convenient for forming the solid bottom 20 within the head 16. The annular flange 82 is made sufficiently long that when the outer end thereof is bent inwardly, such as by an operation known as spinning, the terminal end thereof is disposed adjacent the outer surface of bottom 20 and a liquid-tight seal is effected by applying a ring 84 of solder, epoxy resin, or the like, between the terminal end of annular flange 82 and the adjacent wall of bottom 20.

In forming the head 16 by the method referred to immediately above, such as by turning solid bar stock upon a lathe, after the outer surface of the head has been suitably machined, one side thereof may be bored transversely to receive a cylindrical plug which, when completed, will form head plug 40, and appropriately securing the plug into said bore, such as by soldering, or the like, after which the inner cavity 86 of head 16, as best shown in FIG. 3, may be suitably machined. This is followed by the drilling of the necessary holes and bores which extend longitudinally and otherwise within and through the head plug 40, some of which have been described above and others will be described hereinafter. Also, the threads on the interior of the top opening 18 may be formed suitably during such operations for purposes of threadably receiving cap 88 which has complementary threads formed on the periphery thereof. Appropriate means such as a pair of holes 89 are formed in cap 88 to permit rotation such as by a spanner wrench.

Figure 4:
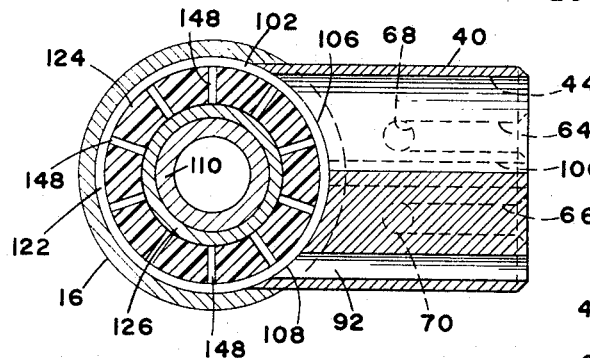
FIG. 4 is a longitudinal horizontal section of the head of the handpiece as shown in FIG. 3 and as viewed on the line 4—4 of said figure.
Figure 5:
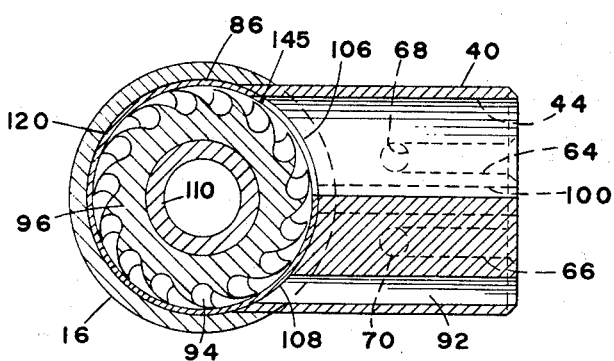
FIG. 5 is a view similar to FIG. 4, but being a horizontal sectional view taken on the line 5—5 of FIG. 3.

The head plug 40 is also provided with additional bores, see FIGS. 4–6, extending longitudinally thereof, the same preferably being of relatively small diameter, especially in comparison with the bore 44 which accommodates the exhaust tube 42. These additional bores respectively comprise driving air inlet hole 92 which is disposed adjacent one side of the head plug 40, as is clearly shown in said figures. In view of this arrangement of the inlet delivery hole 92, the driving air delivered thereby from the plenum chamber 38 is discharged substantially tangentially into the cavity 86 of head 16 so as to impinge upon the vanes 94 of impeller 96 illustrated in detached manner in FIG. 5, the mounting of which is described hereinafter.

The head plug 40 also is provided, adjacent the top and bottom thereof, with additional bores comprising inlet holes 98 and 100 which respectively communicate at the discharge ends thereof with upper annular manifold space 102 and lower annular manifold space 104 respectively within the upper and lower portions of the head 16, details of the formation of which are set forth hereinafter. The inner ends of the bearing air inlet holes 98 and 100 each communicate freely with the air supply plenum chamber 38, whereby it will be seen that it is preferably contemplated by the present invention to employ air of substantially the same pressure, both to supply the air bearings, to be described, and to drive the impeller of the turbine. The invention is not to be restricted to such preferred arrangement, however. Further, the shape of the inlet end 106 of the air discharge bore 44, where it merges with the inner cylindrical cavity 86 of head 16, is clearly shown in FIGS. 4 and 5, the same being on the opposite side of head plug 40 from the delivery end 108 of the driving air inlet hole 92.

The most essential feature of the present invention comprises a cartridge 109 and especially its components and function thereof. The principal components are illustrated in exploded form in FIG. 7, with the exception of cap 88, illustrated therein, which actually does not comprise part of said cartridge. The component elements of said cartridge, as illustrated in FIGS. 7 and 13, comprise a tubular shaft 110 upon one end of which a lower, conical rotor bearing 112 is press-fitted, said bearing preferably having a counter-bored socket 114 therein to receive one end of said shaft with a press-fit. Surrounding the lower rotor bearing 112 is a lower stator bearing 116, details of which are described hereinafter. Supporting one end of lower stator bearing 116 is a lower annular resilient and distortable spring or washer 118, the periphery of which normally abuts the lower end of spacing sleeve 120 which is placed upon the shaft either before or after the rotor impeller 96 is press-fitted upon the shaft in desired longitudinal position thereon.

An upper resilient and distortable spring or washer 122, at its periphery, abuts the upper end of spacing sleeve 120 and, to facilitate the abutment of the opposite ends of said spacing sleeve by said resilient springs, the opposite ends of said sleeve comprise annular flanges directed inwardly for a short distance. Upper flexible spring 122 receives upper stator bearing 124, which is preferably identical with lower stator bearing 116, said upper bearing surrounding the upper conical rotor bearing 126 which is press-fitted onto the upper end of tubular shaft 110 at the completion of the assembly of the cartridge.

It will be seen that the rotor bearings 112 and 126 preferably are substantially identical, with the exception of the counter-bored socket 114 formed in the lower rotor bearing 112. Both the lower and upper rotor bearings have conical exterior surfaces which respectively flare radially outward and longitudinally away from each other when mounted upon shaft 110, somewhat in hourglass arrangement. The conical angle of the exterior surfaces of the rotor bearings preferably are identical and, actually, said bearings are frustro-conical in that they do not continue to a point.

The lower and upper stator bearings 116 and 124 preferably are formed of self-lubricating material, such as compressed graphite or solid carbon members, the same being suitably machined or otherwise finished to have preferably segmental spherical surfaces 128 on the outermost ends thereof which, as will be seen from FIG. 13, respectively engage preferably complementary segmental spherical surfaces on the seat 130 formed in the upper portion of bottom 20 of head 16, and similarly shaped seat 132 formed on the interior of cap 32 when the cartridge 110 is mounted in operative position within the inner cavity 86 of head 16. The spherical configuration of the bearing surfaces 128 and the complementary surfaces of the seats 130 and 132 are for purposes to be described. The inner conical surfaces of stator bearings 116 and 124 are exactly complementary to the outer surfaces of rotor bearings 112 and 126.

The upper and lower stator bearings 116 and 124, adjacent the inner ends thereof, are provided with additional preferably segmental spherical surfaces 134, which adjoin short, axial and annular projections 136 which respectively project through the central openings 138 of the resilient springs 118 and 122 which, if desired, may be of the Belleville spring-type. Initially, they may be either flat or dished, as desired. The springs 118 and 122 also may be considered flexible to a limited extent, especially to be flexed to a shape distorted from the original shape, but such flexibility is not of the type normally attributed to plastic or pliable items.

As indicated above, the outer peripheral edges of the resilient springs 118 and 122 respectively abut the inwardly directed annular flanges at the opposite ends of the spacing sleeve 120 which, preferably, is formed from a metal tube of suitable wall thickness and, at one side thereof, a longitudinally extending index projection 140 is pressed outwardly for slidable reception within an indexing groove 142 shown in FIG. 13 as being cut into the inner wall of head 16 adjacent the junction of said head with head plug 40.

The purpose of indexing elements 140 and 142 is to suitably align exhaust port 144 in the side wall of spacing sleeve 120 and inlet port 145 formed therein, in circumferentially spaced relationship to the exhaust port 144, as shown in FIG. 7, respectively with the inlet end 106 of discharge bore 44 and the delivery end 108 of air inlet hole 92 which tangentially inpinges upon the vanes of impeller 96 to rotate the entire rotor comprising said impeller, shaft 110, and the rotor bearings 112 and 126 fixed thereupon. The interior of the shaft 110 also preferably carries a chuck 146, see FIG. 13, of any suitable design, which supports the bur 80 or other type of dental tool.

When all of the components of the cartridge 110 have been assembled in the manner described hereinabove, it is preferable that the coengageable, complementary conical surfaces of both sets of rotor and stator bearings be firmly in engagement with each other and the press-fitting of the upper rotor bearing 126 upon tubular shaft 110 preferably is continued until the relationship substantially as illustrated in FIG. 13 is achieved, wherein no running clearance is shown between the stator and rotor bearings and all components of the cartridge which engage each other are substantially in firm contact and the stator bearings are centric relative to the perimeters of the central openings 138 in springs 118 and 122. Such centric relationship is established incident to initial assembly of the cartridge.

The stator bearings 124 and 116, when the cartridge is not mounted in head 16, also are maintained in firm engagement with the respective rotor bearings contained therein by the force exerted by the resilient springs 118 and 122 through the seating of the segmental spherical surfaces 134 of the stator bearings within said perimeters of the central openings 138 in said springs. Such centric seating of the stator bearings relative to springs 118 and 122 also provides initially firm self-seating of the stator bearings 116 and 124 with respect to the rotor bearings 112 and 126, whereby a precise and substantially even alignment of the complementary conical surfaces of the rotor and stator bearings automatically is established.

It also will be seen that movement of the spacing sleeve 120 is restrained only with respect to rotary movement and not longitudinal movement. Under normal circumstances, substantially little or no longitudinal movement occurs, however. The sleeve 120 nevertheless is free to move longitudinally if required to do so, especially for very small increments of distance, incident to the stator bearings aligning themselves appropriately and preferably evenly with respect to the rotor bearings when running clearance is being established therebetween. However, for purposes of separating the upper and lower manifold spaces 102 and 104 from each other, it is preferred that a relatively close, but sliding, fit be provided between sleeve 120 and the inner surface of cavity 86.

For purposes of delivering air to the complementary conical surfaces of the rotor and stator bearings, the stator bearings are each provided with a similar series of air delivery ports 148, which, as can be best seen from FIG. 4, said inlet ports are spaced, preferably evenly, circumferentially with respect to each other. A substantial number of such ports are provided in each stator bearing, these being dimensioned to afford the correct supply of bearing air between the adjacent conical surfaces of the upper and lower sets of rotor and stator bearings after running clearance is established between the same.

Air is delivered to the outer ends of the ports 148 in the stator bearings respectively from the upper and lower annular manifold spaces 102 and 104, as can be best seen from FIG. 13. Also, from said figure, it can be seen that the upper and lower boundaries of said annular manifold spaces respectively are defined by the engagement of the segmental spherical surfaces 128 of the stator bearings with their respective seats in the bottom of the head 16 and the cap 88, while the opposite boundaries are defined by the resilient springs 118 and 122 which actually function as lateral projections extending inward from flanges on the opposite ends of spacing sleeve 120 and firmly engage surfaces 134 on stator bearings 116 and 124. As a result, it will be seen the annular manifold spaces both are formed automatically as a result of inserting the cartridge 109 within the interior cavity 86 of head 16.

As indicated above, all components of the cartridge 109, when not mounted within the head 16, are in relatively firm contact with each other, including the complementary conical surfaces of the stator and rotor bearings being in non-rotatable relationship with each other. One of the highly advantageous features of the present invention concerns the ease of establishing a desired running clearance between said complementary conical surfaces of each pair of stator and rotor bearings, automatically and evenly, which is accomplished as follows.

When cap 88 is removed from head 16, the open upper end of head 16 is in condition to receive the cartridge 109. Upon inserting the normally lower end of the cartridge within the interior of head 16, the surface 128 of lower stator bearing 116 engages seat 130 in the bottom 20 of head 16. The complementary segmental spherical surfaces 128 and 130 readily afford centering of the lower end of cartridge 109 within the head, such centering also being facilitated by the relatively close complementary nature of sleeve 120 with respect to the inner wall of head 16. The cap 88 then is threaded into the upper end of head 16 which brings the segmental spherical seat 132 in the cap into engagement with the upper segmental spherical end 128 of upper stator bearing 124.

Preferably such initial engagement of the cap with the cartridge is of relatively light nature to permit said complementary surfaces 128 and 132 to effect centering of the upper end of the cartridge with respect to the head of the handpiece, as well as place similar pressure upon coengaged surfaces 128 and 130 on the lower end of the cartridge and in the bottom 20 of head 16, thereby establishing the entire cartridge coaxially within said head. Continued inward threading of the cap places inwardly directed axial pressure upon upper stator bearing 124 which pressure, in turn, is successively transmitted to upper resilient spring 122, spacing sleeve 120, lower resilient spring 118, lower stator bearing 116, and seat 130 in bottom 20. This sequence of operations actually primarily comprises moving seat 132 toward seat 130 and results in the stator bearings 116 and 118 being moved axially toward each other. Such movement is relative to the rotor bearings 112 and 126 which, being fixed axially upon shaft 110, results in spaces being developed between the pairs of stator and rotor bearings which comprise running clearances between said bearings of each pair thereof, to form air bearings.

After development of such running clearances commences, the same is automatically equalized between the bearings of each pair by reason of the identical nature of resilient springs 118 and 122 and the ability of sleeve 120 to move axially while transmitting axial movement of the upper stator bearing to the lower stator bearing. Further, the rotor and its rotor bearings 112 and 126 are free to move axially, as a fixed unit, within the limits afforded by the running clearances between the pairs of stator and rotor bearings. Hence, the rotor offers no impedance to such automatic and simultaneous establishment of running clearances between the pairs of stator and rotor bearings.

The establishment of said running clearances is achieved by threading the cap 88 into the upper end of the head of the handpiece while air is delivered under suitable pressure to the upper and lower manifold spaces 102 and 104 by means of bearing inlet holes 98 and 100 in head block 40. Determining desired running clearances preferably is achieved by listening to the sound of the rotor. For example, upon initial contact of the cap with the upper stator bearings, there are no running clearances between the pairs of bearings and the rotor is stationary, notwithstanding the fact that driving air is being discharged against the vanes 94 of the rotor; such driving air all simply passes out exhaust bore 44 and the bearing air is trapped in the manifold spaces 102 and 104 under such circumstances.

After the initial engagement of the cap with the upper stator bearing of the cartridge has effected axial centering of the cartridge within the head of the handpiece, as explained above, continued threading of the cap into the head causes compression of the stator bearings toward each other, as aforesaid, thereby establishing initial spacing between each pair of stator and rotor bearings. The discharge of driving air against the rotor vanes 94 initiates rotation of the rotor and thereby permits equalizing of the clearance spaces between the pairs of bearings. However, such initial operation of the handpiece produces a high pitched whine and indicates that more clearance is needed to establish desired equal running clearance between the bearings of each pair thereof.

The pitch of the complementary threads on the cap and in the upper end of the head of the handpiece is relatively fine, so as to permit precise adjustment of the running clearances between the bearings of each pair. Accordingly, following such initial spacing of the bearings as aforesaid, a slight amount of additional threading of the cap into the head results in desired operation and equal spacing of the bearings of each pair to produce a desired running clearance therebetween. When the latter has been established, the initial whine disappears and the operation thereafter is substantially entirely silent.

The spacing of the stator bearings from their mating rotor bearings by the procedure just described is made possible by the equal flexing of the resilient annular springs 118 and 122. Such flexing of these springs also results in producing firm clamping of the stator bearings 112 and 124 between the perimeters of the central openings 138 and the seats 130 and 132 in the cap and bottom 20 of the head. Although there are spaced segmental spherical surfaces 128 and 134 respectively adjacent opposite ends of each stator bearing, these are useful primarily in the initial seating of the cartridge components with respect to each other to establish basic alignment of all of said cartridge components. Hence, when the pressure which establishes the running clearances of said bearings is applied, the clamping forces exerted in opposite directions by said spring perimeters respectively toward the bearing seats in the cap and bottom of the head are such as to firmly grip the stator bearings to hold the same against any misalignment or rotation.

In actual practice, it has been found that said perimeters and seats tend to at least minutely bite or dig into the carbon surfaces 128 and 134 of the stator bearings and thus enhance said gripping of the same at said aforementioned axially spaced surfaces 128 and 134 of each stator bearing. After the running clearance has been established between the pairs of stator and rotor bearings as aforesaid, the cap may be secured suitably against rotation by using any of a number of expedients such as cement, light staking, or otherwise.

Bearing air is delivered from a suitable source, under pressure, to plenum chamber 38 and from there is discharged equally, through inlet holes or ports 98 and 100 respectively to the upper and lower manifold spaces 102 and 104. From said spaces, the bearing air is delivered through the ports 148 of the stator bearings to the running clearance between each set of rotor and stator bearings after the same have been established. Hence, it will be seen that especially when the rotor is running free, i.e., with no thrust being put upon the operating member exemplified by the bur 80, the rotor, including the rotor bearings 112 and 126 respectively on opposite ends thereof, will be spaced evenly, in an axial direction, between the stator bearings 116 and 124.

In view of the preferred, rather appreciable angle between the conical surfaces of said bearings, it also will be seen that the sets of cooperable rotor and stator bearings effectively comprise combination radial and thrust bearings. Also, such design of air bearings employs the principle that, when either axial or lateral thrust is imposed upon the shaft and, correspondingly upon the rotor bearings with respect to the stator bearings, any tendency to decrease the running clearance between either pair of the bearings results in increased resistance thereto through the development of increased pressures in the remaining space between the relatively moving bearing surfaces. However, if such thrusts are of sufficient degree that actual frictional contact is made between one of the rotor bearings and its corresponding stator bearing and if such contact is hard enough, the rotor will stop, but the self-lubricating nature of the stator bearings, as described above, prevents any serious danger to either the rotor or stator bearings.

The imposition of an unusually high degree of thrust against the shaft, in any direction, will result in the rotor being stopped instantly. Because of the preferred self-lubricating nature of the stator bearings, however, upon relieving the shaft of such thrusts, rotation of the rotor is immediately resumed. Further, during such, usually only momentary, stopping of the rotor, continual delivery of air to both the bearings and impeller will continue, but no harm results. Rather, such continual delivery of air insures instantaneous starting of the rotation of the rotor upon discontinuing the thrust.

While the stator bearings have been described above as being formed preferably from compressed graphite, solid carbon, or the equivalent, and in actual practice, the rotor bearings 112 and 126 are formed from suitable metal such as stainless steel, brass, or the like, it is to be understood that the invention is not to be restricted to such materials. Actually, it is only necessary that the materials from which the stator and rotor are formed or with which they must be coated be compatible under the circumstances that, when frictional contact occurs between the bearings of either pair, as when overloads occur, neither bearing will sustain damage and sticking of the bearings to each other does not occur. Hence, it is preferred that the material from which at least one bearing of each pair is formed or with which it is coated, be of a self-lubricating nature.

The air film which flows through the running clearance between the rotor and stator bearings discharges from opposite ends of said space. With respect to the upper pair of stator and rotor bearings, such discharge at the upper end of the same, as viewed in FIG. 13, passes through horizontal space 150 and exits through discharge port 152 in cap 88. Discharge from the opposite end of said running clearance passes into the impeller cavity 154 within which the vanes 94 revolve and such discharge exits from said cavity through the discharge bore 106 for transmission through exhaust tube 42 and then into the interior 50 of the handle 10. The spent driving air, upon being discharged from the vanes 94 of the impeller, likewise exits in the same manner.

With respect to the lower set of rotor and stator bearings, the spent bearing air discharging from the running clearance between said bearings exits axially inwardly into the lower portion of impeller cavity 154, as viewed in FIG. 13. The opposite end of said running clearance discharges into another horizontal space 156 adjacent the lower face of rotor bearing 112, the same communicating with annular discharge opening 158 which surrounds the lower end of chuck 146. It will be seen from this figure that the latter air discharges along the shank of the dental tool and provides a certain amount of cooling thereof and also slightly aids in facilitating the operation of the cooling spray of mixed air and water which discharges from the ports 78.

Control of the delivery of bearing and driving air to the inlet end of conduit 32 is afforded by any suitable control mechanism, not illustrated in the present drawings. Such control mechanism may be in the form of suitable pressure-regulating valves, delivery valves, and the like, which normally are included in a control unit mounted either in a dental stand or console, or otherwise. Direct delivery of such air to a handpiece may be controlled by a foot-actuated switch or valve so that the dentist will have both hands free for manipulating the handpiece and other instruments, such as a dental mirror, or the like. However, all of such control is in accord with apparatus not comprising part of the present invention and thus no detailed description thereof is believed to be necessary.

Because of the preferred self-lubricating nature of the stator bearings 116 and 124, the need for any supplementary lubrication is eliminated, whereby it is only necessary to provide preferably dry air, under pressure, for both the bearing and driving use to the head of the handpiece. It is preferred that the air be filtered, however, inasmuch as the running clearance between the rotor and stator bearings is exceedingly small under most circumstances and, particularly when running free, i.e., without thrust upon the dental tool mounted in the chuck of the handpiece, such clearance is approximately within the range of between .0004″ and .00045″. It is to be understood, however, that these dimensions are in proportion to the actual size of the bearings and primarily are indicated for illustrative purposes, rather than being restrictive.

To appreciate the significance of the foregoing dimensions, it is indicated that the head 16 is as small as possible in order to be accommodated readily within human oral cavities, including those of children, as well as adults. Under such circumstances, the maximum diameter of the head is within the range of between ⅜″ and ½″ and the maximum axial dimension thereof is approximately ½″.

As has been indicated above, the cartridge assembly 109 readily is insertable within and removable from the interior cavity 86 of the head 16, but, preferably, this is done at a service center or factory. Hence, if the operation of the rotor fails or it is unsatisfactory to service the same, it is only necessary to remove the cartridge assembly, as a unit, by unscrewing cap 88. A new or rebuilt cartridge then immediately may be inserted in the head 16 and the used cartridge can be serviced and/or rebuilt in due course.

Upon insertion of the cartridge in the head, the segmental spherical surface 128 of the lower stator bearing 116 will engage seat 130 in the bottom 20 of the head of the handpiece. Incident to such insertion, the indexing projection 140 is disposed in indexing groove 142 on the interior of the head of the handpiece so as properly to align the exhaust port 144 and inlet port 145 in spacing sleeve 120 with the corresponding ends of discharge bore 106 and inlet port 108. Lastly, it is then only necessary to thread the cap 88 into the upper end of the head 16 for engagement of the seat 132 in cap 88 with the segmental spherical surface 128 on the outer end of the upper stator bearing 124, such threading being continued until desired running clearance is established between the stator and rotor bearings, by the technique described hereinabove.

If desired, appropriate movement-determining indicia may be provided on the cap and the adjacent rim of opening 18. Also, the fit of the threads on the cap 88 with respect to the complementary threads in the opening 18 of the head preferably is reasonably tight so as to maintain such final adjustment of the head when the desired running clearance has been achieved, especially if no auxiliary locking means are utilized, such as cement, staking, or the like.

Reference also has been made in the foregoing to the provision of muffle structure 24 at the rear end of the handle 10 of the handpiece. Considering FIG. 8, it will be seen that said muffle structure may comprise either a series of felt-like, relatively porous elements 160 suitably stacked upon the assembled conduits 32, 52 and 54 or a cylinder 162 of synthetic felt or the like, capable of relatively long life, and the inner end of which is suitably cemented to the inner ends 164 of the hollow interior of the muffle structure 24. The outer end of the cylinder of felt 162 also is cemented, for example, to the inner end-wall 30 of the coupling means 12. If preferred, both the stack of elements 160 and cylinder 162 may be used but if only the cylinder of felt 162 is used, it will be understood the interior will be hollow. Said cylindrical felt sleeve 162 is of suitable length to extend between the opposite ends of the slots 126 in the muffle structure 24, whereby no exhaust air, either from the bearings or the turbine, can discharge to atmosphere without first being diffused through the cylindrical felt sleeve 162 and/or the filter elements 160 for purposes of sound reduction.

While the invention has been described and illustrated in its several preferred embodiments, it should be understood that the invention is not to be limited to the precise details herein illustrated and described since the same may be carried out in other ways falling within the scope of the invention as claimed.

I claim:

1. An air turbine motor comprising in combination, a housing, means on said housing connectable to a source of air under pressure for delivery thereof to said housing, a rotor shaft extending coaxially within said housing, impeller means on said rotor shaft intermediately of the ends thereof, a pair of combination radial and thrust rotor bearings mounted on said rotor shaft and respectively extending similarly in opposite directions, a pair of combination radial and thrust stator bearings supported in said housing respectively adjacent opposite ends thereof and in coaxial nested arrangement with said rotor bearings, said rotor and stator bearings respectively having complementary generally tapered surfaces, axially variable yieldable means extending between said stator bearings and operable to exert pressure simultaneously upon the same in opposite axial directions relative to each other to position said bearings in desired cooperative axial positions relative to said rotor bearings, positioning means comprising rigid seat means in one end of said housing positioned to engage one of said stator bearings and a member adjustably movable axially in the opposite end of said housing and having rigid seat means therein engageable with the other stator bearing, said adjustably movable member being operable to move said stator bearings adjustably relative to each other and to said rotor bearings in opposition to the pressure exerted upon said stator bearings by said axially variable yieldable means to establish and maintain a desired running clearance between said stator and rotor bearings to constitute air bearings, and means to supply air under pressure to said clearance between said bearings and to said impeller, whereby said motor is adapted for use in a dental handpiece.

2. The motor according to claim 1 in which said coacting pairs of rotor and stator bearings have complementary substantially conical surfaces flaring outwardly and away from each other toward said opposite ends of said head.

3. The motor according to claim 1 in which said axially variable means include resilient means engageable with the inner end portions of said stator bearings.

4. The motor according to claim 3 in which said axially variable means comprise spacing means at least part of which surround said impeller means of said rotor.

5. The motor according to claim 1 in which said rotor and rotor bearings, stator bearings and axially variable means comprises an assembled cartridge movable as a unit for insertion within and removal from one end of said housing, and said positioning means being within said housing and movable into engagement with the outer end portions of said stator bearings against the action of said axially variable means to establish a desired running clearance between the bearings of said sets of nested stator and rotor bearings.

6. The motor according to claim 5 in which said adjustable member which is movable axially in the opposite end of said housing comprises a cap detachably connected to said opposite end of said housing and has one of said rigid seat means therein.

7. The motor according to claim 6 in which said seats have segmental spherical surfaces and the portions of said stator bearings engaged thereby have complementary surfaces to permit effective alignment of said stator bearings relative to said rotor bearings.

8. The motor according to claim 7 in which said axially variable resilient means comprise resilient members having central circular openings and said stator bearings have additional segmental spherical surfaces thereon seated within the perimeters of said central openings of said resilient means, thereby permitting adjustable seating of said stator bearings relative thereto and self-alignment of said stator bearings relative to said rotor bearings.

9. The motor according to claim 3 in which said resilient means are relatively flat resilient annular springs having substantially central openings therein.

10. The motor according to claim 9 in which said stator bearings have segmental spherical surfaces therein respectively engaging the peripheries of the central openings of said annular springs.

11. The motor according to claim 10 in which spacing means extend axially between and engage the outer peripheries of said springs.

12. The motor according to claim 11 in which said positioning means are operable to move said stator bearings toward each other against the action of said springs to establish desired running clearance between said stator and rotor bearings and said spacing means being movable axially to equalize flexing of said springs.

13. The motor according to claim 1 in which the peripheries of said stator bearings are spaced radially inward from the interior walls of said housing and said seats in opposite ends of said housing respectively engage the outer ends of said stator bearings, projecting means spaced axially inward from said seats and extending radially outward from said stator bearings toward the inner walls of said housing, thereby to define annular air manifolds around said stator bearings between said seats and projecting means and arranged to receive air from said air supply means, and a plurality of air passages extending through the walls of said stator bearings to receive air from said manifolds and direct it to the running clearances between said stator and rotor bearings.

14. The motor according to claim 13 in which said projecting means comprise said axially variable yieldable means engaging said stator bearings and said engagement being adjacent the inner ends of said bearings.

15. The motor according to claim 13 further including support means extending from said housing and having air conducting means entering said housing respectively adjacent the upper and lower ends thereof and aligned directly with said manifolds to receive air under pressure therefrom.

16. An air turbine dental handpiece comprising in combination, an elongated handle having a head on one end thereof and means on the other end connectable to a source of air under pressure for delivery thereof to said head, a rotor shaft extending coaxially within said head, impeller means on said rotor shaft intermediately of the ends thereof, a pair of combination radial and thrust rotor bearings mounted on said rotor shaft and respectively extending similarly in opposite directions, a pair of combination radial and thrust stator bearings supported in said head respectively adjacent the opposite ends thereof and in coaxial nested arrangement with said rotor bearings, said rotor and stator bearings respectively having complementary generally tapered surfaces, axially variable yieldable means extending between said stator bearings and operable to exert pressure simultaneously upon the same in opposite axial directions relative to each other to position said bearings in desired cooperative axial positions relative to said rotor bearings, positioning means comprising rigid seat means in one end of said head positioned to engage one of said stator bearings and a member adjustably movable axially in the opposite end of said head and having rigid seat means therein engageable with the other stator bearing, said adjustably movable member being operable to move said stator bearings adjustably relative to each other and to said rotor bearings in opposition to the pressure exerted upon said stator bearings by said axially variable yieldable means to establish and maintain a desired running clearance between said stator and rotor bearings to constitute air bearings, means to supply air under pressure to said clearance between said bearings and to said impeller, said head having a bottom at one end provided with a central opening permitting access to one end of said rotor shaft for attaching of a dental tool thereto and having a diameter large enough to form an annular opening to discharge air from one of said bearings outwardly along said rotor shaft, and said head further including liquid spray means comprising a circular flange extending axially outward from the periphery of said bottom of said head and integral therewith, said flange being turned inwardly and the inner terminal edge of said flange engaging said bottom to define therewith an annular spacing comprising a liquid manifold, means forming a liquid-tight seal between said terminal edge of said flange and bottom, liquid inlet means formed in said flange and connectable to a source of liquid to supply liquid to said manifold, and discharge port means formed in said flange and directed toward the axis of said rotor shaft to permit discharge of at least one stream of liquid from said manifold toward said axis and in a direction to be intersected by air discharging along said shaft to form a spray therefrom.

References Cited

UNITED STATES PATENTS

| | | | |
|---|---|---|---|
| Re. 25,964 | 2/1966 | Williams | 32—27 |
| 2,326,180 | 8/1943 | Stempel | 308—166 XR |
| 2,732,267 | 1/1956 | Stover | 308—166 XR |
| 3,210,848 | 10/1965 | Bizzigotti | 32—27 |
| 3,256,604 | 6/1966 | Borden | 32—28 |

LOUIS G. MANCENE, *Primary Examiner.*

S. NATTER, *Assistant Examiner.*